Patented May 26, 1942

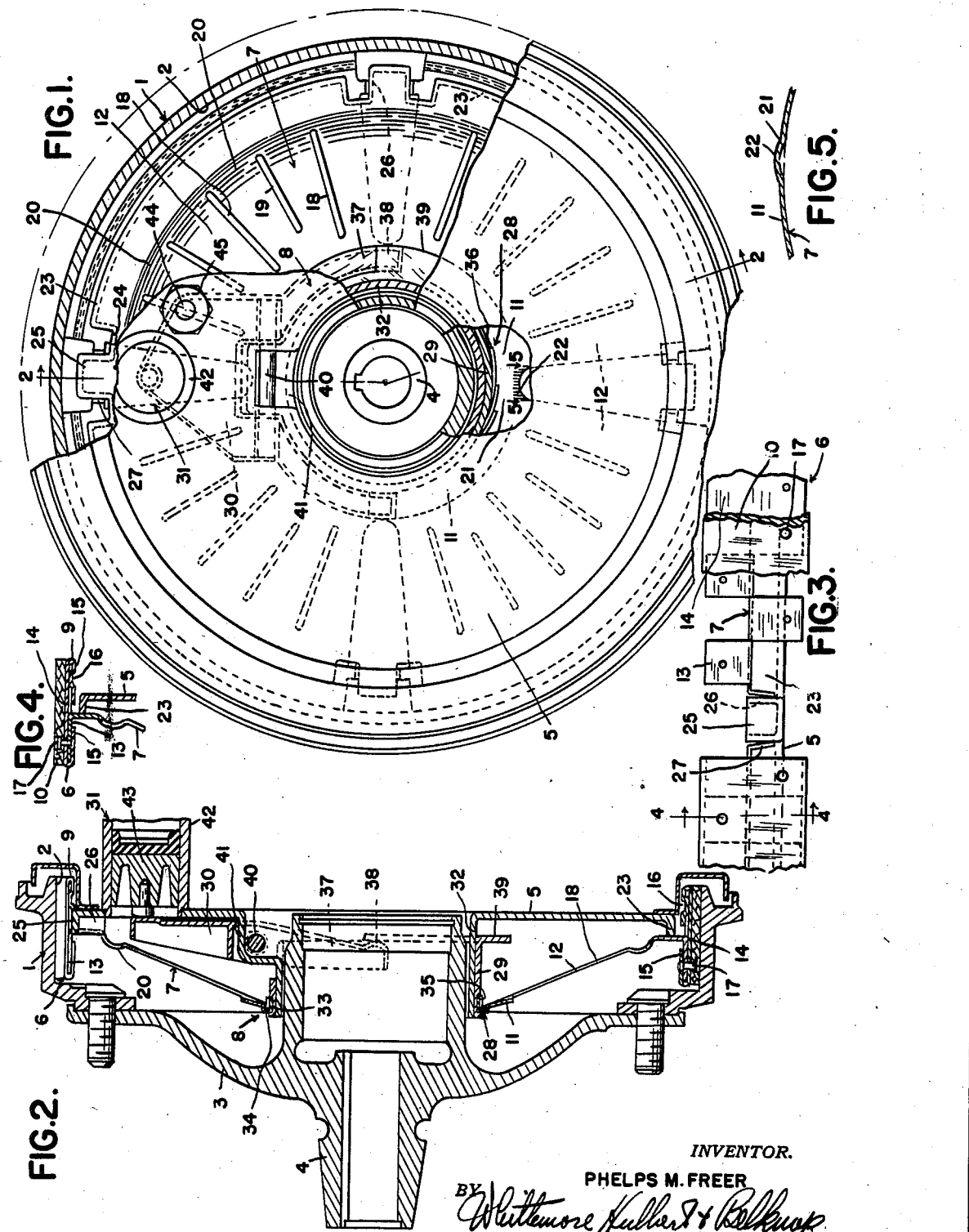

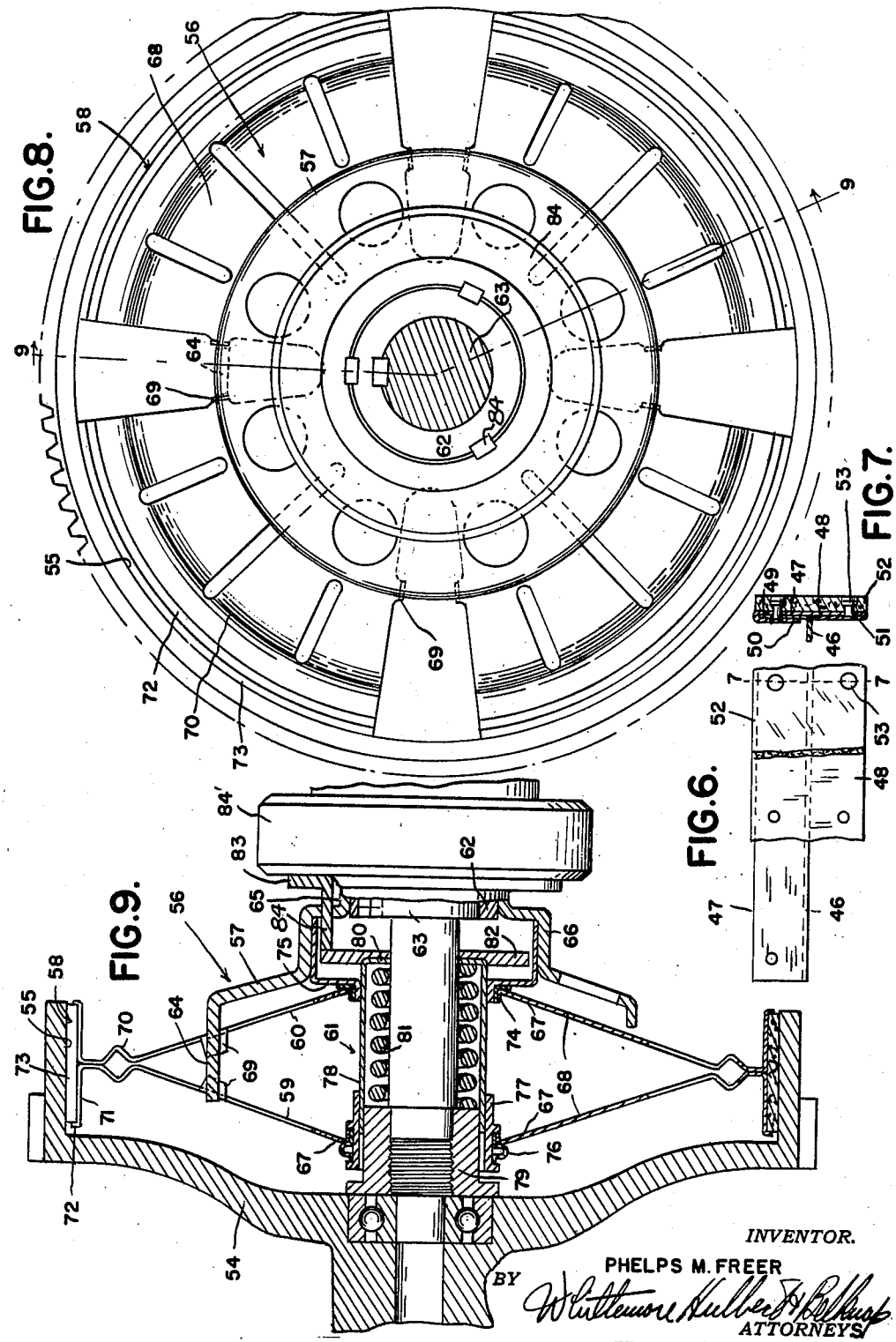

2,284,193

UNITED STATES PATENT OFFICE 2,284,193

FRICTION COUPLING

Phelps M. Freer, Detroit, Mich.

Application August 2, 1940, Serial No. 349,883

13 Claims. (Cl. 188—78)

The invention relates to friction couplings for effecting a common state of motion or rest of two relatively rotatable elements. If both elements are rotatable, the coupling is a clutch, while if one element is rotatable and the other is non-rotatable, the coupling is a brake.

The invention has for some of its objects to provide an improved friction coupling comprising relatively rotatable elements adapted to be frictionally coupled, one of the elements comprising two members held from relative rotation by a yieldable connection; to provide an improved friction coupling in which the means for holding the two members from relative rotation is yieldable and then positive, depending upon the torque; and to provide an improved friction coupling in which the means for holding the members from relative rotation acts at peripherally spaced zones and allows for manufacturing tolerances.

The invention has for other objects to provide an improved friction coupling constructed to readily withstand the stresses to which it may be subjected and also constructed to avoid objectionable free play between the parts with resultant noise; to provide an improved resilient disc forming part of the friction coupling; to provide an effective manner of operatively connecting the disc to the friction member; and to provide a strong, substantial construction of backing plate for cooperating with the resilient disc during its operation.

These and other objects of the invention will become apparent from the following description and claims, taken in connection with the accompanying drawings, in which Figure 1 is an elevation, partly broken away, of a friction coupling showing an embodiment of my invention;

Figure 2 is a cross section on the line 2—2 of Figure 1;

Figure 3 is a peripheral view with the outer coupling element removed;

Figure 4 is a cross section on the line 4—4 of Figure 3;

Figure 5 is a cross section on the line 5—5 of Figure 1;

Figure 6 is a view similar to Figure 3, showing a modification;

Figure 7 is a cross section on the line 7—7 of Figure 6;

Figure 8 is a view similar to Figure 1 showing another embodiment of my invention;

Figure 9 is a cross section on the line 9—9 of Figure 8.

The friction coupling illustrated in Figures 1 to 5, inclusive, is a brake in which one of the elements is rotatable and the other of the elements is non-rotatable. The rotatable element comprises the brake drum 1 having the internal friction face 2. The brake drum, as shown, is mounted upon the fixed flange 3 of the hub 4, the fixed flange being provided with suitable means for securing a vehicle wheel thereto.

The non-rotatable element forms a self-contained unit and comprises the backing plate 5, the friction member 6 engageable with the internal friction face 2 of the brake drum, the dished disc 7 for actuating the friction member, and the mechanism 8 for actuating the disc. The backing plate is fixed either upon the axle housing or the steering spindle of the vehicle. The friction member is formed of the series of brake shoes 9 having the arcuate friction linings 10 engageable with the internal friction face of the brake drum.

The dished disc 7 is resilient, being formed of spring material. The disc has the hub 11 and the spokes 12 radiating from the hub, there being preferably one spoke for each brake shoe. Each of the spokes has the alternate oppositely directed integral flanges 13 at its outer end for attachment to the associated brake shoe 9. The body of the brake shoe is in the nature of an arcuate sheet metal envelope embracing the flanges and having the radially outer axial portion 14 extending over the radially outer surfaces of the flanges and the radially inner return-bent portions 15 extending over the radially inner faces of the flanges. The parts of each radially inner portion 15 between the flanges at the same side of the associated spoke are depressed to form the bosses 16 contacting with and welded to the radially outer portion 14. The friction lining 10 forming part of the brake shoe and both the radially outer and radially inner portions 14 and 15, respectively, of the envelope are fixed to the associated spoke by suitable means, such as the rivets 17, extending through the flanges. Each of the spokes is formed with the radial slots 18 and the radial slots 19, the latter being between the former. All of the slots terminate at their outer ends at the same distance from the center, while the slots 18 terminate at their inner ends near the outer edge of the hub. Each of the spokes is also formed with the transverse generally U-shaped bend 20 near its outer end concentrically of the disc and located so that the outer ends of the radial slots 18 and 19 terminate in the radially outer wall of the bend. By reason of the bends and the radial slots, the flexibility of the spokes is increased so that the friction lining may more easily conform to the internal friction face of the brake drum. The portions 21 of the hub of the disc between and connecting the spokes are peripherally bowed in an axial direction progressively from a zone near the inner edge of the hub to the outer edge thereof, as at 22, to prevent excessive stretching of the material of the disc when it is axially compressed and radially expanded, the radial expansion taking place in the hub.

By reason of the construction of disc and of brake shoes fixedly attached to the periphery thereof, the disc is adapted to positively move the brake shoes toward and away from the internal friction face of the brake drum. At the same time, the assembly of disc and brake shoes is substantial to withstand the stresses to which it is subjected in use and at the same time provide for the desired flexibility.

The backing plate 5 is provided at its periphery with a continuous axially extending flange having the parts 23 engageable with the rear sides of the spokes 12, the radially depressed parts 24 at the ends of the spokes, and the parts 25 between the radially depressed parts. The parts 25 preferably are spaced from the center of the backing plate a greater distance than the parts 23. The parts 25 with the radial parts 26 connecting the parts 24 and 25 form channel-shaped axial tongues or projections which extend between adjacent spokes 12 of the disc to hold the latter from rotation relative to the backing plate. Opposed transverse flanges 27 extend integrally from the portions of the side edges of the spokes 12 between their bends 20 and peripheral flanges 13. The opposed flanges 27 converge toward their free ends and are located on opposite sides of and engage the tongues or projections to form a yieldable and, more particularly, a resilient connection between the backing plate and the disc. The tongues or projections on the disc preferably extend slightly beyond the adjacent portions of the spokes so that if the disc is subjected to sufficient torque its transverse projections may yield until the side edges of the spokes come to a positive stop against the tongues or projections.

The actuating mechanism 8 comprises the mounting collar 28, the sleeve 29, the lever 30 and the wheel cylinder 31 for actuating the lever. The sleeve encircles and engages the central forwardly turned axial flange 32 of the backing plate 5, the annular flange encircling and being preferably spaced from the rear portion of the hub 4. The front end of the sleeve is formed with the annular groove 33 in which is located the mounting collar. The mounting collar is transversely split and resilient and is formed with the radial flange 34 and the axial flange 35, the latter being provided with the annular series of peripherally extending resilient tongues 36 struck out therefrom. The radial flange abuts the front face of the hub 11 of the disc and the resilient tongues abut the inner edge of the hub of the disc so that rearward movement of the sleeve and mounting collar will move the hub of the disc rearwardly to flatten the same and cause the brake shoes connected to its periphery to move radially outwardly into engagement with the internal friction face of the brake drum. By reason of the resilient tongues, each of the brake shoes will be moved against the internal friction face.

The lever 30 is bifurcated and the ends of its furcations 37 are formed with the rounded bearings 38 for engaging the front face of the substantially semi-circular radial flange 39 formed upon the rear end of the sleeve 29. The lever is mounted upon the ends of the shaft 40 which extend through the depression 41 in the backing plate. It will be noted that the lever is formed of sheet metal and reinforced by flanges extending axially of the brake, these flanges, in effect, making the furcations of the lever channel-shaped.

The wheel cylinder is formed in any usual manner and, as shown, comprises the cylinder 42 and the piston 43 slidable within the cylinder and engageable with the free upper end of the lever. The lever is also adapted to be mechanically actuated by means of the axially movable rod 44 extending through the nipple 45 threadedly engaging the backing plate 5. The front end of the rod is engageable with the free upper end of the lever and the nipple forms an adjustable stop for limiting the rearward movement of the free upper end of the lever, which in turn limits the dishing of the disc and positions the brake shoes in off position with respect to the brake drum.

In operation, when braking liquid is forced into the wheel cylinder 31 or the rod 44 is mechanically forced outwardly, the dished disc 7 will be flattened through the intermediate mounting collar 28, the sleeve 29, and the lever 30. The flattening of the disc causes the same to expand and its outer diameter to be increased, thereby moving the brake shoes 9 radially outwardly against the internal friction face 2 of the brake drum 1 to apply the brake. By reason of the resilient mounting collar, the brake shoes and disc are allowed to center with respect to the brake drum to thereby secure more complete and uniform contact with its internal friction face. By reason of the radial slots 18 and 19 and the transverse bend 20 the disc may be more easily flexed and the friction lining may more easily conform to the internal friction face of the brake drum. Because of the resilient flanges 27 upon the backing plate 5, rotation of the brake shoes and the disc is yieldably and resiliently resisted during the application of the brake until the torque is such that the edges of the spokes of the disc at their junctions with the flanges abut the tongues or projections upon the backing plate when further rotation is positively resisted. Upon release of pressure of the braking liquid, or removal of pressure upon the actuating rod, the disc because of its inherent resiliency resumes its normal dished state and in doing so moves the brake shoes radially inwardly and away from the internal friction face of the brake drum. At the same time the disc axially moves the sleeve, the lever and the piston of the wheel cylinder or the rod to their normal positions, as determined by the adjustable nipple upon the backing plate.

Figures 6 and 7 illustrate a modified construction of disc and brake shoe assembly in which 46 is the resilient dished disc formed in generally the same manner as the disc 7, with the exception that each of its spokes is formed with the continuous arcuate peripheral flange 47 throughout substantially its width. 48 is a sheet metal envelope embracing the flange and extending equally in opposite directions from the portion of the disc connecting into the flange. This envelope has the radially outer portion 49, the return-bent radially inner portion 50 cooperating with the radially outer portion to embrace the flange, and the return-bent radially inner portion 51 engaging the adjacent part of the radially outer portion at the opposite side of the disc. The friction lining 52 and the envelope are fixedly secured to the disc by suitable means, such as the rivets 53, which extend through the transverse flange. The lining is also suitably secured as by means of rivets to the portion of the envelope at the opposite side of the disc.

The friction coupling illustrated in Figures 8 and 9 is a clutch in which both of the elements are rotatable. One of the elements 54, which may be designated the driving element, has the internal friction face 55. The other of the elements 56, which may be designated the driven element, forms a self-contained unit and comprises the backing plate or the cage plate 57, the friction member 58 engageable with the internal friction face 55, the resilient dished discs 59 and 60 connected to the friction member, and the mechanism 61 for actuating the discs. The backing plate is fixed upon the bushing 62 which is secured to the driven shaft 63. The backing plate has at its periphery the axially extending tongues or projections 64, the inner axial portion 65 fixedly secured to the bushing and the intermediate axial portion 66. The discs 59 and 60 are opposed to each other and each is formed with the hub 67 and the spokes 68 radiating from the hub. The construction of the hub and spokes is generally the same as disclosed in Figures 1 to 5, inclusive, the exceptions being that the number of radial slots is less and the location of the resilient converging flanges 69 extending from the side edges of the spokes and engageable with the tongues or projections 64 is radially inwardly of the transverse bends 70 near the radially outer ends of the spokes. Also, the spokes of each disc are formed with the integral transverse flanges 71 throughout their widths and terminating in the radial flanges 72, the friction lining 73 of the friction member being located between the terminal flanges 72 and fixedly secured to the transverse flanges 71 by suitable means, such as rivets.

The disc 60 is mounted upon the resilient mounting collar 74, which in turn is mounted upon the annular mounting 75 secured to and preferably having a press fit in the intermediate annular portion 66 of the backing plate. The disc 59 is mounted upon the resilient mounting collar 76 which is located in an annular groove in the sleeve 77 fixed upon the sleeve 78. Both of the mounting collars 74 and 76 are formed in the same manner as the mounting collar 28. The sleeve 78 is slidably mounted upon the bushing 79 secured to the driven shaft 63 near its end. The sleeve is also slidable within the reduced portion of the annular mounting 75 and has the inturned end 80. 81 is a coil spring encircling the shaft 63 and abutting the bushing 79 and the inturned end 80 and normally urging the disc 59 toward the disc 60 to thereby normally hold both discs in expanded position to retain the friction member against the internal friction face of the driving element. For disengaging the friction member, there is the collar 82 engageable with the inturned end 80 and the collar 83 having the fingers 84 extending through the backing plate and engageable with the collar 82. The collar 83 is adapted to be moved longitudinally against the effort exerted by the coil spring 81 by suitable means, such as the member 84'.

What I claim as my invention is:

1. In a friction coupling, the combination of relatively rotatable elements, one of said elements having an internal friction face and the other of said elements comprising a radially movable friction member engageable with said friction face, a resilient dished disc operatively connected at its periphery to said friction member, and a member having a resilient connection with said disc for holding said disc from rotation relative to said member.

2. In a friction coupling, the combination of relatively rotatable elements frictionally engageable with each other, one of said elements comprising a resilient dished spoked disc, a member at a side of said disc, and yieldable means between certain of the spokes of said disc and said member for holding said disc and member from relative rotation.

3. In a friction coupling, the combination of relatively rotatable elements frictionally engageable with each other, one of said elements comprising a resilient dished spoked disc having opposed flanges extending from the side edges of its spokes, and a non-rotatable member having projections extending between and engaging said opposed flanges.

4. In a friction coupling, the combination of relatively rotatable elements frictionally engageable with each other, one of said elements comprising a resilient dished spoke disc having opposed converging flanges extending from the side edges of its spokes, and a non-rotatable plate having integral channel-shaped projections at its periphery extending between and engaging said opposed flanges.

5. In a friction coupling, the combination of relatively rotatable elements frictionally engageable with each other, one of said elements comprising a resilient dished spoked disc having a transverse bend in each spoke to increase the flexibility in an axial direction.

6. In a friction coupling, the combination of relatively rotatable elements, one of said elements having an internal friction face and the other of said elements comprising a resilient dished spoked disc adapted when being flattened to expand toward said friction face, said disc having its spokes formed with transverse bends and generally radial slots extending into the bends to increase the flexibility of the spokes.

7. In a friction coupling, the combination of relatively rotatable elements, one of said elements having an internal friction face and the other of said elements comprising a friction member movable radially into engagement with said friction face, and a resilient dished spoked disc adapted when being flattened to expand toward said friction face, said disc having a flanged periphery to which said friction member is secured and spokes formed with transverse substantially U-shaped bends and slots extending generally radially outwardly into the bends whereby said friction member may more easily conform to said friction face.

8. In a friction coupling, the combination of relatively rotatable elements, one of said elements having an internal friction face and the other of said elements comprising friction lining movable radially into engagement with said friction face, and a resilient dished spoked disc adapted when being flattened to expand toward said friction face, said disc having a transverse flange at its periphery and an envelope embracing said flange, said friction lining being secured to said flange and envelope.

9. In a friction coupling, the combination of relatively rotatable elements, one of said elements having an internal friction face and the other of said elements comprising friction lining movable radially into engagement with said friction face, and a resilient dished spoked disc adapted when being flattened to expand toward said friction face, said disc having alternate oppositely directed transverse flanges at its periphery and an envelope embracing said flanges, said friction lining being secured to said flanges and envelope.

10. In a friction coupling, the combination of relatively rotatable elements, one of said elements having an internal friction face and the other of said friction elements comprising friction lining movable radially into engagement with said friction face, and a resilient dished spoked disc adapted when being flattened to expand toward said friction face, said disc having a continuous arcuate peripheral flange throughout substantially the width of each spoke and to which said friction lining is secured.

11. In a friction coupling, the combination of relatively rotatable elements, one of said elements having an internal friction face and the other of said elements comprising a radially movable friction member engageable with said friction face, a resilient dished spoked disc operatively connected at its periphery to said friction member, said disc having spokes formed with transverse substantially U-shaped bends and slots extending generally radially outwardly into the bends, and a non-rotatable plate having portions engaging corresponding sides of said spokes radially beyond said bends and having portions extending between adjacent spokes and engaging the side edges thereof.

12. In a friction coupling, the combination of relatively rotatable elements, one of said elements having an internal friction face and the other of said elements comprising oppositely dished spoked discs adapted when being flattened to expand toward said friction face, friction lining at the radially outer ends of said spokes for engaging said friction face, a member at a side of one of said discs, and projections on said member for extending between adjacent spokes of both discs to hold said discs from rotation.

13. In a friction coupling, the combination of relatively rotatable elements, one of said elements having an internal friction face and the other of said elements comprising oppositely dished spoked discs adapted when being flattened to expand toward said friction face, friction lining at the radially outer ends of said spokes for engaging said friction face, a member having projections for extending between adjacent spokes of both discs to hold said discs from relative rotation, and means at the centers of said discs for normally urging the same in a direction to flatten the discs.

PHELPS M. FREER.